(12) United States Patent
Choi

(10) Patent No.: US 10,358,946 B2
(45) Date of Patent: Jul. 23, 2019

(54) EXPANSION APPARATUS FOR RECOVERING WASTE HEAT AND WASTE HEAT RECOVERY SYSTEM INCLUDING THE SAME

(71) Applicants: Hyundai Motor Company, Seoul (KR); Kia Motors Corporation, Seoul (KR)

(72) Inventor: Do Sun Choi, Whasung-Si (KR)

(73) Assignees: Hyundai Motor Company, Seoul (KR); Kia Motors Corporartion, Seoul (KR)

( * ) Notice: Subject to any disclaimer, the term of this patent is extended or adjusted under 35 U.S.C. 154(b) by 15 days.

(21) Appl. No.: 15/795,634

(22) Filed: Oct. 27, 2017

(65) Prior Publication Data
US 2018/0328233 A1    Nov. 15, 2018

(30) Foreign Application Priority Data
May 11, 2017  (KR) .......................... 10-2017-0058406

(51) Int. Cl.
| | |
|---|---|
| F01K 23/06 | (2006.01) |
| F01D 15/10 | (2006.01) |
| F01K 23/04 | (2006.01) |
| F01K 23/08 | (2006.01) |
| F02G 5/04 | (2006.01) |
| F22B 1/18 | (2006.01) |
| F02C 6/12 | (2006.01) |
| F02C 6/18 | (2006.01) |
| F02G 5/02 | (2006.01) |

(52) U.S. Cl.
CPC ............ *F01K 23/065* (2013.01); *F01D 15/10* (2013.01); *F01K 23/04* (2013.01); *F01K 23/08* (2013.01); *F02G 5/04* (2013.01); *F22B 1/1807* (2013.01); *F02C 6/12* (2013.01); *F02C 6/18* (2013.01); *F02G 5/02* (2013.01)

(58) Field of Classification Search
CPC ............................... F01K 23/065; F01K 23/04
USPC .................................................. 60/614–620
See application file for complete search history.

(56) References Cited

U.S. PATENT DOCUMENTS

| | | | | |
|---|---|---|---|---|
| 2012/0047892 A1* | 3/2012 | Held | .................. | F01K 3/185 |
| | | | | 60/652 |
| 2012/0073289 A1* | 3/2012 | Ast | .................. | F01K 23/065 |
| | | | | 60/618 |
| 2014/0186174 A1* | 7/2014 | Malfa | .................. | F01D 25/24 |
| | | | | 415/220 |

FOREIGN PATENT DOCUMENTS

DE             4426354 A1 *  2/1996 ............. F01D 25/34

* cited by examiner

*Primary Examiner* — Mark A Laurenzi
*Assistant Examiner* — Mickey H France
(74) *Attorney, Agent, or Firm* — Morgan, Lewis & Bockius LLP

(57) ABSTRACT

An expansion apparatus for recovering waste heat may include two or more turbines and a distribution valve distributing working fluid supplied from the boiler to the two or more turbines, wherein the two or more turbines include a power turbine and one or more auxiliary turbines, and the power turbine is configured to receive a larger amount of working fluid than the one or more auxiliary turbines.

15 Claims, 4 Drawing Sheets

EXPANSION APPARATUS FOR RECOVERING WASTE HEAT AND WASTE HEAT RECOVERY SYSTEM INCLUDING THE SAME

CROSS-REFERENCE TO RELATED APPLICATION

The present application claims priority to Korean Patent Application No. 10-2017-0058406, filed on May 11, 2017, the entire contents of which is incorporated herein for all purposes by this reference.

BACKGROUND OF THE INVENTION

Field of the Invention

The present invention relates to an expansion apparatus for recovering waste heat and a waste heat recovery system including the same. More specifically, the present invention relates to an expansion apparatus for recovering waste heat, the expansion apparatus being configured for stably producing electrical energy and/or mechanical energy irrespective of the flow rate of working fluid supplied from a boiler of a waste heat recovery system, and relates to a waste heat recovery system including the same.

Description of Related art

Internal combustion engines have been widely used in vehicles, ships, small generators, and the like, and many attempts have been made constantly to increase efficiency of internal combustion engines. Internal combustion engines discharge a large amount of heat as waste heat, and waste heat recovery systems have been developed to recover waste heat as energy and increase the overall efficiency of internal combustion engines.

These waste heat recovery systems are configured to recover waste heat from internal combustion engines as energy, convert the recovered energy into electrical or mechanical energy, and supply the converted electrical or mechanical energy to the internal combustion engines, accessories, or the like of the vehicles.

The waste heat recovery systems have a Rankine cycle to effectively recover waste heat from an internal combustion engine. The Rankine cycle includes a circulation path through which working fluid circulates, and has a boiler (evaporator), an expander, a condenser, and a pump along the circulation path of the Rankine cycle. The boiler (evaporator) heats and evaporates the working fluid by use of waste heat from the internal combustion engine (heat in exhaust gas and/or heat in EGR gas). The expander expands the high-temperature and high-pressure working fluid supplied from the boiler. The condenser condenses the working fluid discharged from the expander. The pump is located in the circulation path to circulate the working fluid.

The expander includes a housing and an expander wheel that is rotatable within the housing, and the expander wheel is rotated by the high-temperature and high-pressure working fluid supplied from the boiler. When the expander wheel is rotated by the high-temperature and high-pressure working fluid, rotational energy is generated and then transferred to a motor-generator or the crankshaft of the internal combustion engine to generate electrical or mechanical energy.

However, the flow rate of the working fluid supplied from the boiler to the expander may vary depending on an operating condition of the internal combustion engine, and thus the expander may not regularly generate rotational energy.

In addition, since the conventional expander has a structure in which the RPM of the expander wheel is increased, efficiency in generating rotational energy may not be substantially improved.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an expansion apparatus for recovering waste heat and a waste heat recovery system including the same, the expansion apparatus being configured for stably producing electrical energy and/or mechanical energy by maintaining uniform efficiency in generating rotational energy irrespective of the flow rate of working fluid supplied from a boiler, in which the flow rate varies depending on an operating condition of an internal combustion engine.

The technical problems to be solved by the present invention are not limited to the aforementioned problems, and any other technical problems not mentioned herein will be clearly understood from the following description by those skilled in the art to which the present invention pertains.

According to various aspects of the present invention, an expansion apparatus for recovering waste heat, which is disposed between a boiler and a condenser of a waste heat recovery system, may include two or more turbines and a distribution valve distributing working fluid supplied from the boiler to the two or more turbines. The two or more turbines may include a power turbine and one or more auxiliary turbines. The power turbine may be configured to receive a larger amount of working fluid than the one or more auxiliary turbines.

The power turbine may be configured to receive the working fluid at a first flow rate to generate mechanical energy. The one or more auxiliary turbines may be configured to receive the working fluid at a second flow rate to generate mechanical energy. The amount of working fluid at the first flow rate may be greater than the amount of working fluid at the second flow rate.

The power turbine and the one or more auxiliary turbines may be removably connected by a clutch.

The power turbine may be coupled to a motor-generator by a first shaft, and a battery may be connected to the motor-generator.

The power turbine and the one or more auxiliary turbines may be integrated with one another within a single housing.

The distribution valve may be configured to distribute the working fluid to the power turbine and the one or more auxiliary turbines based on a flow rate of the working fluid that varies depending on an operating condition of an internal combustion engine.

A first distribution line and a second distribution line may be connected to the distribution valve. The first distribution line may be connected to an inlet of the power turbine. The second distribution line may be connected to the one or more auxiliary turbines. A bypass line may be connected between the second distribution line and the first distribution line.

The one or more auxiliary turbines may include a first auxiliary turbine and a second auxiliary turbine that are connected to a second shaft in a row.

The first and second auxiliary turbines may have different capacities.

The condenser may be connected to an outlet of the power turbine, and the second distribution line may be connected to an inlet of the first auxiliary turbine. A connecting line is connected between an outlet of the first auxiliary turbine and an inlet of the second auxiliary turbine. A discharge line may be connected to an outlet of the second auxiliary turbine, and the discharge line may join the first distribution line A flow meter may be disposed in at least one of the first and second distribution lines, and an operation of the distribution valve may be controlled based on a flow rate change of the working fluid that is detected by the flow meter.

The expansion apparatus for recovering waste heat, according to an exemplary embodiment of the present invention, may further include a heat exchanger that transfers heat to the working fluid supplied from the outlet of the first auxiliary turbine to the inlet of the second auxiliary turbine through the connecting line.

According to various aspects of the present invention, a waste heat recovery system may include a boiler heating and evaporating working fluid, an expansion apparatus expanding the working fluid supplied from the boiler to generate mechanical energy, and a condenser condensing the working fluid discharged from the expansion apparatus. The expansion apparatus may include two or more turbines and a distribution valve that distributes the working fluid supplied from the boiler to the two or more turbines. The two or more turbines may include a power turbine and one or more auxiliary turbines. The power turbine may be configured to receive a larger amount of working fluid than the one or more auxiliary turbines.

A motor-generator may be connected to the power turbine through a first shaft. A second shaft may be connected to the one or more auxiliary turbines. A clutch may be located between the first and second shafts.

The waste heat recovery system may further include an external shaft connected to at least one of the first and second shafts.

A power transmission mechanism may be connected to the external shaft.

The one or more auxiliary turbines may have a guide groove formed on the internal surface of an inlet chamber into which the working fluid is introduced.

As set forth above, the expansion apparatus for recovering waste heat and the waste heat recovery system including the same, according to exemplary embodiments, are configured for stably producing electrical energy and/or mechanical energy by maintaining uniform efficiency in generating rotational energy irrespective of the flow rate of working fluid supplied from the boiler, the flow rate varying depending on an operating condition of an internal combustion engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
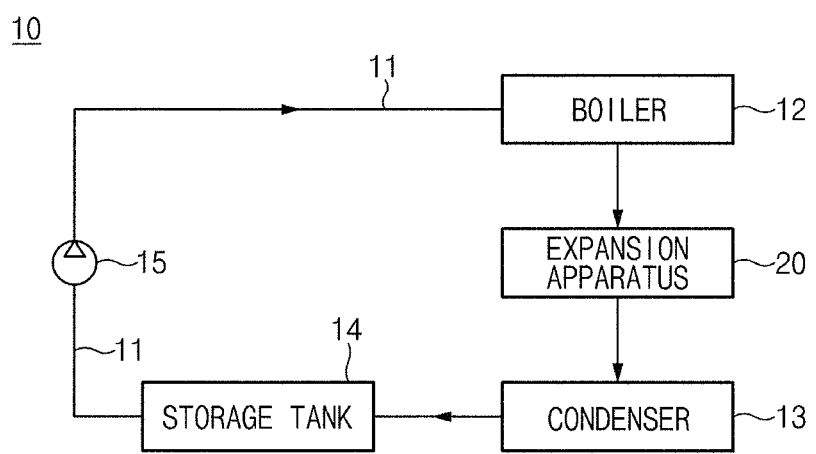
FIG. 1 illustrates a waste heat recovery system according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in portion by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), exemplary embodiments of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms including "first", "second", "A", "B", "(a)", "(b)", and the like, may be used herein to describe elements of the present invention. Such terms are only used to distinguish one element from another element, and the substance, sequence, order, or number of these elements is not limited by these terms. Unless otherwise defined, all terms used herein, including technical and scientific terms, have the same meaning as those understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a waste heat recovery system according to an exemplary embodiment of the present invention may include a Rankine cycle 10 configured to recover waste heat from an internal combustion engine.

The Rankine cycle 10 may include a circulation path 11 through which working fluid circulates, and may include a boiler 12, an expansion apparatus 20, a condenser 13, and a circulation pump 15 along the circulation path 11. The boiler 12 may heat and evaporate the working fluid by use of waste heat from the internal combustion engine (heat in exhaust gas and/or heat in EGR gas). The expansion apparatus 20 may expand the working fluid supplied from the boiler 12 to generate rotational energy. The condenser 13 may condense the working fluid discharged from the expansion apparatus 20. The circulation pump 15 may be located in the circulation path 11 to circulate the working fluid.

A storage tank 14 may be disposed between the condenser 13 and the boiler 12, and the working fluid condensed by the condenser 13 may be stored within the storage tank 14.

The circulation pump 15 may be located between the storage tank 14 and the boiler 12 to circulate the working fluid stored within the storage tank 14.

The expansion apparatus 20 may include two or more turbines 21, 22, and 23 and a distribution valve 27 distributing the working fluid supplied from the boiler 12 to the two or more turbines 21, 22, and 23.

The two or more turbines 21, 22, and 23 may include a power turbine 21 and one or more auxiliary turbines 22 and 23, and the power turbine 21 may receive a larger amount of working fluid than the one or more auxiliary turbines 22 and 23 to generate higher mechanical energy.

The power turbine 21 may be configured to receive the working fluid at a first flow rate to generate mechanical energy (rotational energy), and the one or more turbines 22 and 23 may be configured to receive the working fluid at a second flow rate to generate mechanical energy (rotational energy). The amount of working fluid at the first flow rate may be greater than the amount of working fluid at the second flow rate. The first flow rate may refer to a high flow rate at which a relatively large amount of working fluid flows when a large amount of waste heat is recovered from the internal combustion engine, and the second flow rate may refer to a low flow rate at which a relatively small amount of working fluid flows when a small amount of waste heat is recovered from the internal combustion engine.

The power turbine 21 may be configured to convert expansion (pressure drop) of the working fluid into mechanical energy. The power turbine 21 may be configured to convert the absorbed thermal energy of the working fluid into rotational energy. Accordingly, the power turbine 21 is an expander that is configured for converting high-temperature and high-pressure fluid into mechanical energy by rotating a thing including a shaft, to convert pressurized fluid into rotational energy. The power turbine 21 may have a turbine wheel and a first shaft 31 connected to the turbine wheel.

The power turbine 21 may include, or may be, a turbine, a turbo, an expander, or another device that receives and expands the working fluid discharged from the boiler 12. The power turbine 21 may have an axial turbine wheel or a radial turbine wheel, and may be a single-staged device or a multi-staged device. Exemplary turbines that may be used in the power turbine 21 may include an expander, a geroler, a gerotor, a valve, other types of positive displacement devices (such as, pressure swing), a turbine, a turbo, or any other device configured for converting a pressure or a pressure/enthalpy drop in working fluid into mechanical energy. Various types of expanders may operate in the system of the present invention and may achieve different performance characteristics by which the expanders may be used as the power turbine 21.

The power turbine 21 may be coupled to a motor-generator 25 by the first shaft 31. A gear box may be located between the power turbine 21 and the motor-generator 25. The gear box may be adjacent to the first shaft 31, or may encompass the first shaft 31.

The first shaft 31 may be a single component, or may include two or more components coupled together. According to various aspects of the present invention, a first segment of the first shaft 31 may extend from the power turbine 21 to the gear box, and a second segment of the first shaft 31 may extend from the gear box to the motor-generator 25. A plurality of gears may be disposed between the first and second segments of the first shaft 31 and may be coupled to the first shaft 31 within the gear box. In some configurations, the first shaft 31 may include a sealing assembly configured to prevent or capture any working fluid leakage from the power turbine 21.

Figure 2:
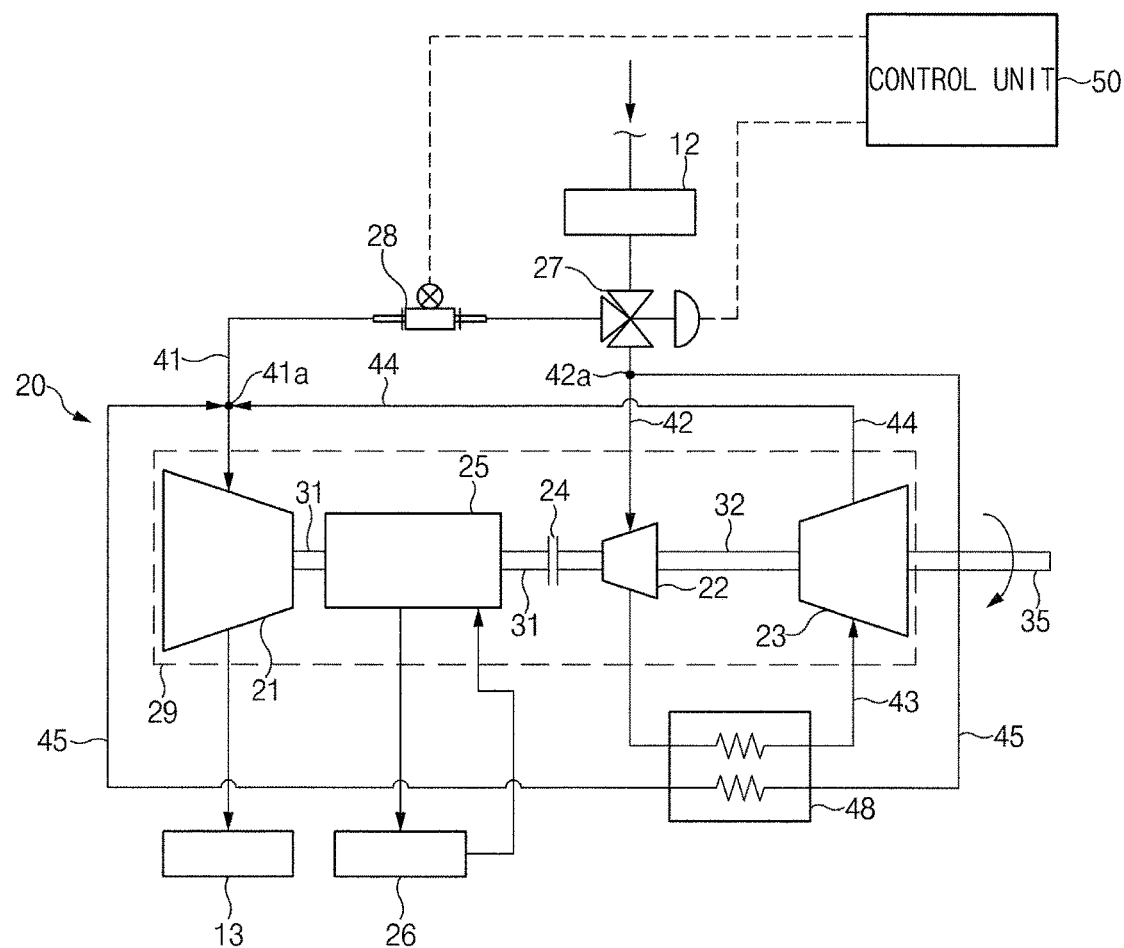
FIG. 2 is a block diagram of an expansion apparatus for recovering waste heat according to an exemplary embodiment of the present invention.

The first shaft 31 may extend outward from the motor-generator 25, as illustrated in FIG. 2.

The motor-generator 25 may include a generator that generates electrical energy and a motor powered by electrical energy. The generator and the motor may be mechanically coupled together, and a battery 26 may be electrically connected to the motor-generator 25.

The one or more auxiliary turbines 22 and 23 may be releasably connected to the power turbine 21 by a clutch 24.

The one or more auxiliary turbines 22 and 23 may be configured to convert expansion (pressure drop) of the working fluid into mechanical energy. The one or more auxiliary turbines 22 and 23 may be configured to convert the absorbed thermal energy of the working fluid into rotational energy. Accordingly, the one or more auxiliary turbines 22 and 23 are expanders that are configured for converting high-temperature and high-pressure fluid into mechanical energy by rotating a thing including a shaft, to convert pressurized fluid into rotational energy. The one or more auxiliary turbines 22 and 23 may have a turbine wheel and a second shaft 32 connected to the turbine wheel.

The one or more auxiliary turbines 22 and 23 may include, or may be, a turbine, a turbo, an expander, or another device that receives and expands the working fluid discharged from the boiler 12. The auxiliary turbines 22 and 23 may have an axial turbine wheel or a radial turbine wheel, and may be a single-staged device or a multi-staged device. Exemplary turbines that may be used in the auxiliary turbines 22 and 23 may include an expander, a geroler, a gerotor, a valve, other types of positive displacement devices (such as, pressure swing), a turbine, a turbo, or any other device configured for converting a pressure or a pressure/enthalpy drop in working fluid into mechanical energy.

The one or more auxiliary turbines 22 and 23 may have a smaller capacity than the power turbine 21 to stably generate mechanical energy (rotational energy) by receiving the working fluid at the second flow rate. For example, the turbine wheels of the one or more auxiliary turbines 22 and 23 may be smaller in size than that of the power turbine 21, and thus the one or more auxiliary turbines 22 and 23 may receive the working fluid at the second flow rate (a low flow rate) to generate rotational energy.

According to various aspects of the present invention, the expansion apparatus 20 may include the first and second auxiliary turbines 22 and 23 distanced from each other, and the first and second auxiliary turbines 22 and 23 may be connected to the second shaft 32 in a row.

The first and second auxiliary turbines 22 and 23 may have different capacities, and According to various aspects of the present invention, the second auxiliary turbine 23 may have a larger capacity than the first auxiliary turbine 22.

Since the one or more auxiliary turbines 22 and 23 include the first auxiliary turbine 22 and the second auxiliary turbine 23, as described above, efficiency in generating mechanical energy (rotational energy) may be maintained at a uniform level even when the working fluid is supplied at the second flow rate (a low flow rate).

According to various aspects of the present invention, the axis line of the first shaft 31 may be aligned with that of the second shaft 32, and the clutch 24 may be positioned between the first and second shafts 31 and 32. The clutch 24 may be selectively engaged or disengaged, and thus the first and second shafts 31 and 32 may be selectively connected together or disconnected from each other.

According to various aspects of the present invention, when the working fluid is supplied from the boiler 12 to the one or more auxiliary turbines 22 and 23 at the second flow rate (a low flow rate), the clutch 24 may be engaged to transfer mechanical energy (rotational energy) generated by the auxiliary turbines 22 and 23 to the motor-generator 25. Accordingly, electrical energy may be stably obtained even when the working fluid is supplied to the expansion apparatus 20 at the second flow rate (a low flow rate).

According to another exemplary embodiment, when the working fluid is supplied from the boiler 12 to the power turbine 21 at the first flow rate (a high flow rate), the clutch 24 may be disengaged to transfer mechanical energy (rotational energy) generated by the power turbine 21 to the motor-generator 25. Accordingly, it is possible to enhance efficiency in generating electrical energy.

The power turbine 21, the one or more auxiliary turbines 22 and 23, and the first and second shafts 31 and 32 of the expansion apparatus 20, according to an exemplary embodiment of the present invention, may be integrated with one another within a single housing 29. This may help to make the waste heat recovery system compact, improving assembly efficiency of the waste heat recovery system when mounting the same in the engine compartment of a vehicle.

The distribution valve 27 may be disposed downstream of the boiler 12. The distribution valve 27 may be disposed between the boiler 12 and the expansion apparatus 20. The distribution valve 27 may be configured to distribute the working fluid to the power turbine 21 and the one or more auxiliary turbines 22 and 23 based on a flow rate of the working fluid that varies depending on an operating condition of the internal combustion engine.

According to various aspects of the present invention, when the internal combustion engine operates at a high speed, a large amount of waste heat may be generated from the internal combustion engine, and thus the working fluid may be supplied from the boiler 12 at the first flow rate (a high flow rate). Under the present condition, the distribution valve 27 may allow a relatively large proportion (about 90%) of the working fluid to be supplied to the power turbine 21 and may allow a relatively small proportion (about 10%) of the working fluid to be supplied to the one or more auxiliary turbines 22 and 23.

According to another exemplary embodiment, when the internal combustion engine operates at a low speed or starts up, a small amount of waste heat may be generated from the internal combustion engine, and thus the working fluid may be supplied from the boiler 12 at the second flow rate (a low flow rate). Under the present condition, the distribution valve 27 may allow a relatively large proportion (about 90%) of the working fluid to be supplied to the one or more auxiliary turbines 22 and 23 and may allow a relatively small proportion (about 10%) of the working fluid to be supplied to the power turbine 21.

The distribution valve 27 may include a three-way valve having an inlet port and two outlet ports. A first distribution line 41 and a second distribution line 42 may be connected to the two outlet ports, respectively.

The first distribution line 41 may be connected to an inlet of the power turbine 21, and the working fluid distributed to the first distribution line 41 may be supplied to the power turbine 21. The condenser 13 may be connected to an outlet of the power turbine 21, and the working fluid having passed through the power turbine 21 may be supplied to the condenser 13.

The second distribution line 42 may be connected to an inlet of the first auxiliary turbine 22, and the working fluid distributed to the second distribution line 42 may be supplied to the first auxiliary turbine 22. A connecting line 43 may be connected between an outlet of the first auxiliary turbine 22 and an inlet of the second auxiliary turbine 23, and thus the first and second auxiliary turbines 22 and 23 may be connected together in series. Accordingly, the working fluid having passed through the first auxiliary turbine 22 may be supplied to the second auxiliary turbine 23 through the connecting line 43. A discharge line 44 may be connected to an outlet of the second auxiliary turbine 23 and may join a junction 41a of the first distribution line 41.

A bypass line 45 may be connected between the first and second distribution lines 41 and 42. The bypass line 45 may branch from a junction 42a of the second distribution line 42 and may join the first distribution line 41. A portion of the working fluid passing through the second distribution line 42 may flow out of the second distribution line 42 through the bypass line 45.

The discharge line 44 and the bypass line 45 may join the first distribution line 41. According to various aspects of the present invention, both the discharge line 44 and the bypass line 45 may join the junction 41a of the first distribution line 41.

According to an exemplary embodiment of the present invention, a flow meter 28 may be disposed in at least one of the first and second distribution lines 41 and 42 and may detect the flow rate of the working fluid passing through the first or second distribution line 41 or 42. The flow meter 28 may detect, in real time, a flow rate change of the working fluid that corresponds to an operating condition of the internal combustion engine, and thus a controller 50 may control the distribution valve 27 to appropriately distribute the working fluid to the first and second distribution line 41 or 42.

Figure 3:
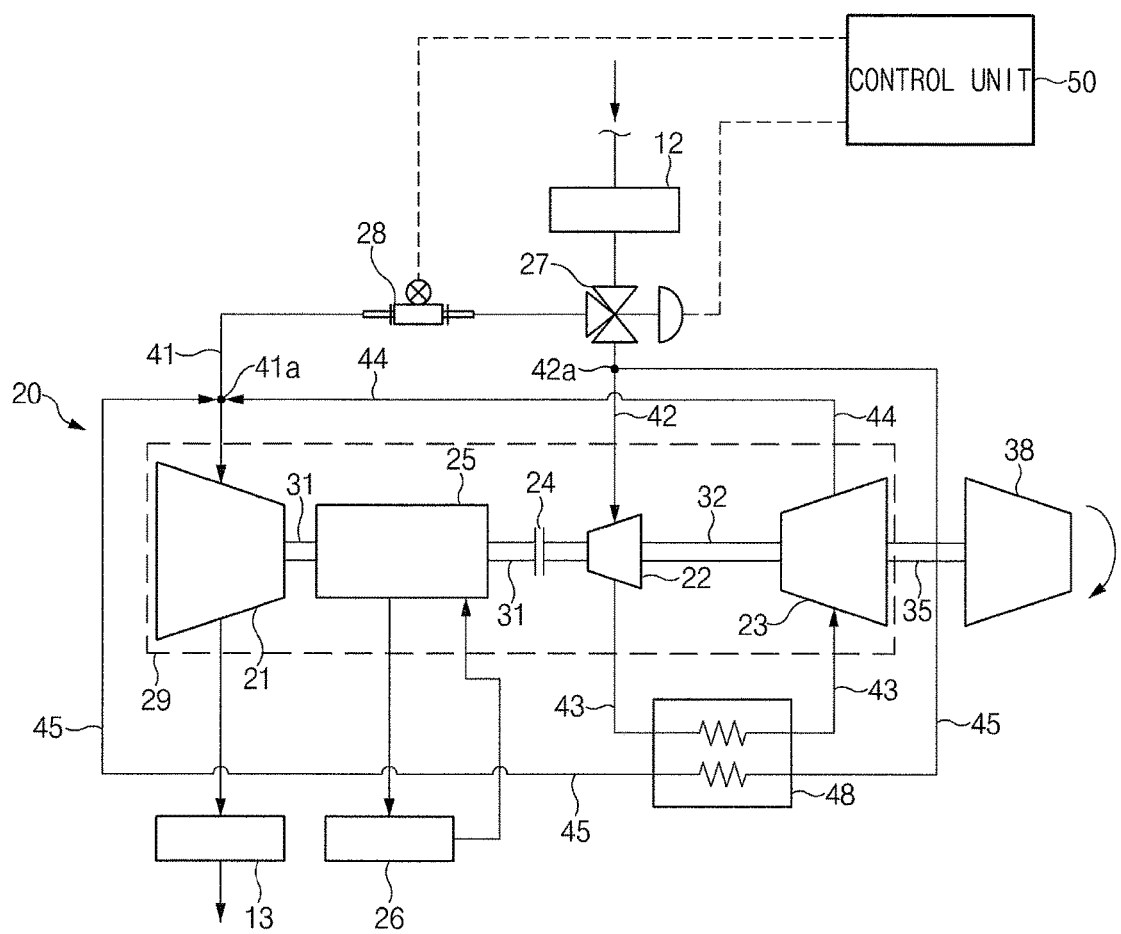
FIG. 3 is a block diagram of an expansion apparatus for recovering waste heat according to another exemplary embodiment of the present invention.

For example, the flow meter 28 may be disposed in the first distribution line 41, as illustrated in FIG. 2 and FIG. 3. In another example, the flow meters 28 may be disposed in the first and second distribution lines 41 and 42, respectively. In another example, the flow meter 28 may be located between the boiler 12 and the distribution valve 27 and may detect the flow rate of the working fluid upstream of the distribution valve 27.

The expansion apparatus 20 according to an exemplary embodiment of the present invention may further include a heat exchanger 48. The heat exchanger 48 may be configured to transfer heat to the working fluid being supplied from the outlet of the first auxiliary turbine 22 to the inlet of the second auxiliary turbine 23 through the connecting line 43.

The heat exchanger 48 may be a recuperator that includes a housing that covers a portion of the connecting line 43 and a portion of the bypass line 45, and the portion of the connecting line 43 and the portion of the bypass line 45 may be configured to make contact with each other, or to be adjacent to each other, within the heat exchanger 48. Accordingly, within the heat exchanger 48, the low-temperature and low-pressure working fluid discharged from the outlet of the first auxiliary turbine 22 may receive heat from the high-temperature and high-pressure working fluid passing through the bypass line 45. As described above, the working fluid discharged from the outlet of the first auxiliary turbine 22 may be changed into a high-temperature state by the heat exchanger 48, and the working fluid in the high-temperature state may be supplied to the inlet of the second auxiliary turbine 23. That is, by maintaining the working fluid discharged from the outlet of the first auxiliary turbine 22 at a high temperature through the heat exchanger 38, it is possible to maintain uniform efficiency in generating mechanical energy (rotational energy) by the second auxiliary turbine 23.

The expansion apparatus 20 may include an external shaft 35 connected to at least one of the first and second shafts 31 and 32.

For example, the external shaft 35 may be integrally connected to the second shaft 32, as illustrated in FIG. 2, and mechanical energy (rotational energy) generated by the power turbine 21 or the one or more auxiliary turbines 22 and 23 may be transferred to the crankshaft or another mechanical portion of the internal combustion engine through the external shaft 35.

In another example, as illustrated in FIG. 3, a power transmission mechanism 38 may be connected to the external shaft 35 to transfer mechanical energy (rotational energy) generated by the power turbine 21 and/or the one or more auxiliary turbines 22 and 23 to the crankshaft or another mechanical portion of the internal combustion engine.

In another example, the external shaft 35 may be connected to a compressor or of a turbocharger that compresses suctioned air in the internal combustion engine. This may help to additionally improve efficiency in compressing the suctioned air by the compressor of the turbocharger.

An operation of the above-configured expansion apparatus of the present invention will be described below in detail.

When an internal combustion engine operates at a high speed, a large amount of waste heat may be generated from the internal combustion engine, and thus working fluid may be supplied from the boiler 12 at a first flow rate (a high flow rate). The distribution valve 27 may allow a relatively large proportion (about 90%) of the working fluid to be supplied to the power turbine 21 and may allow a relatively small proportion (about 10%) of the working fluid to be supplied to the one or more auxiliary turbines 22 and 23.

When the working fluid is supplied to the expansion apparatus 20 at the first flow rate (a high flow rate), a large proportion of the working fluid may be supplied to the power turbine 21 through the first distribution line 41, and a small proportion of the working fluid may be supplied to the one or more auxiliary turbines 22 and 23 through the second distribution line 42. As a result, mechanical energy (rotational energy) may be efficiently generated by the power turbine 21. When the clutch 24 is disengaged, only the power turbine 21 may operate, and the one or more auxiliary turbines 22 and 23 may be in an idle state. A portion of the working fluid passing through the bypass line 45 may be supplied to the power turbine 21 through the first distribution line 41.

When the internal combustion engine operates at a low speed or starts up, a small amount of waste heat may be generated from the internal combustion engine, and thus the working fluid may be supplied from the boiler 12 at a second flow rate (a low flow rate). The distribution valve 27 may allow a relatively large proportion (about 90%) of the working fluid to be supplied to the one or more auxiliary turbines 22 and 23 and may allow a relatively small proportion (about 10%) of the working fluid to be supplied to the power turbine 21.

When the working fluid is supplied to the expansion apparatus 20 at the second flow rate (a low flow rate), a relatively large proportion of the working fluid may be supplied to the one or more auxiliary turbines 22 and 23 through the second distribution line 42, and a relatively small proportion of the working fluid may be supplied to the power turbine 21 through the first distribution line 41. As a result, mechanical energy (rotational energy) may be efficiently generated by the auxiliary turbines 22 and 23 and the power turbine 21. When the clutch 24 is engaged, the power turbine 21 may be in an idle state, and the mechanical energy (rotational energy) generated by the one or more auxiliary turbines 22 and 23 may be transferred to the motor-generator 25 or the crankshaft of the internal combustion engine.

Figure 4:
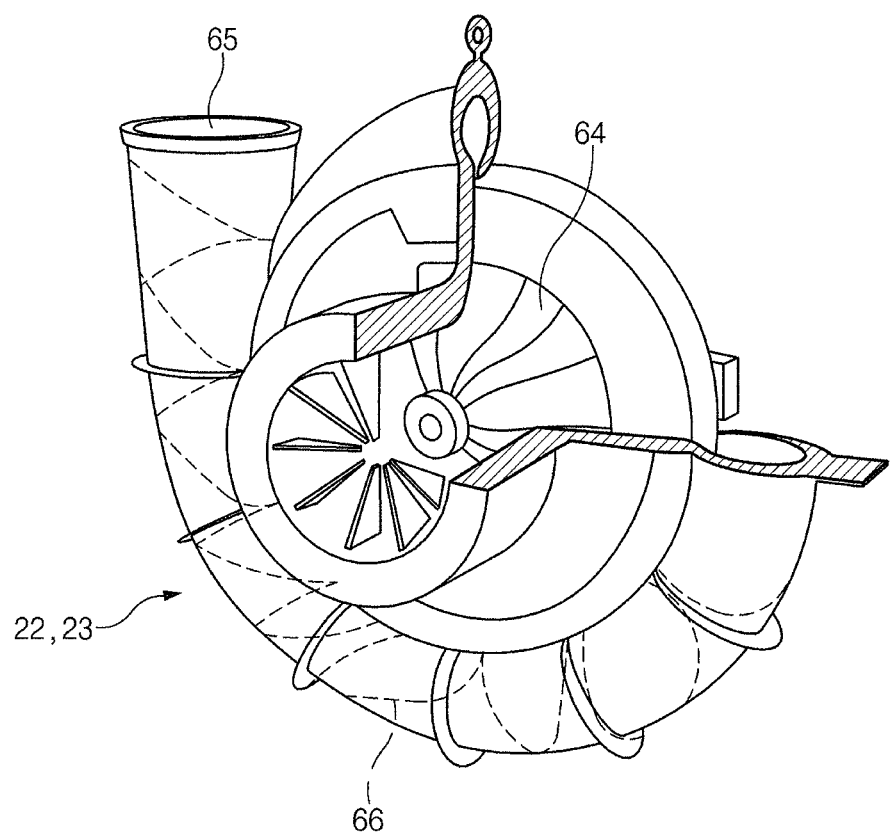
FIG. 4 illustrates an auxiliary turbine of the expansion apparatus for recovering waste heat according to an exemplary embodiment of the present invention.

As illustrated in FIG. 4, the one or more auxiliary turbines 22 and 23 may have a helical or sinusoidal guide groove 66 formed on the internal surface of an inlet chamber 65 into which working fluid is introduced, and the working fluid may be effectively guided to turbine wheels 64 of the respective auxiliary turbines 22 and 23 through the guide grooves 66 to increase the centrifugal force of the turbine wheels 64, enhancing efficiency in generating mechanical energy (rotational energy).

Although the present invention has been described with reference to exemplary embodiments and the accompanying drawings, the present invention is not limited thereto, but may be variously modified and altered by those skilled in the art to which the present invention pertains without departing from the spirit and scope of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An expansion apparatus for recovering waste heat, which is disposed between a boiler and a condenser of a waste heat recovery system, the expansion apparatus comprising:
a power turbine and one or more auxiliary turbines; and
a distribution valve distributing working fluid supplied from the boiler to the power turbine and the one or more auxiliary turbines,
wherein a first distribution line and a second distribution line are connected to the distribution valve, wherein the first distribution line is connected to an inlet of the power turbine, and wherein the second distribution line is connected to the one or more auxiliary turbines,
wherein the one or more auxiliary turbines include a first auxiliary turbine and a second auxiliary turbine that are connected in series,
wherein a discharge line is connected to an outlet of the second auxiliary turbine, and
wherein the discharge line joins the first distribution line.

2. The expansion apparatus of claim 1, wherein the power turbine is configured to receive the working fluid at a first flow rate to generate mechanical energy, wherein the one or more auxiliary turbines are configured to receive the working fluid at a second flow rate to generate mechanical energy, and wherein an amount of working fluid at the first flow rate is configured to be greater than an amount of working fluid at the second flow rate.

3. The expansion apparatus of claim 1, wherein the power turbine and the one or more auxiliary turbines are removably connected by a clutch.

4. The expansion apparatus of claim 1, wherein the power turbine is coupled to a motor-generator by a first shaft, and wherein a battery is connected to the motor-generator.

5. The expansion apparatus of claim 1, wherein the power turbine and the one or more auxiliary turbines are integrated with one another within a single housing.

6. The expansion apparatus of claim 1, wherein the distribution valve is configured to distribute the working fluid to the power turbine and the one or more auxiliary turbines based on a flow rate of the working fluid that varies depending on an operating condition of an engine.

7. The expansion apparatus of claim 1, wherein the first and second auxiliary turbines have different capacities.

8. The expansion apparatus of claim 1, wherein the condenser is connected to an outlet of the power turbine,
wherein the second distribution line is connected to an inlet of the first auxiliary turbine,
wherein a connecting line is connected between an outlet of the first auxiliary turbine and an inlet of the second auxiliary turbine.

9. The expansion apparatus of claim 1, wherein a flow meter is disposed in at least one of the first and second distribution lines, and wherein an operation of the distribution valve is configured to be controlled based on a flow rate change of the working fluid that is detected by the flow meter.

10. The expansion apparatus of claim 8, further including:
a heat exchanger transferring heat to the working fluid supplied from the outlet of the first auxiliary turbine to the inlet of the second auxiliary turbine through the connecting line.

11. A waste heat recovery system comprising:
a boiler heating and evaporating working fluid;
an expansion apparatus expanding the working fluid supplied from the boiler to generate mechanical energy; and
a condenser condensing the working fluid discharged from the expansion apparatus,
wherein the expansion apparatus includes a power turbine and one or more auxiliary turbines and a distribution valve distributing the working fluid supplied from the boiler to the power turbine and the one or more auxiliary turbines,
wherein a first distribution line and a second distribution line are connected to the distribution valve, wherein the first distribution line is connected to an inlet of the power turbine, and wherein the second distribution line is connected to the one or more auxiliary turbines,
wherein the one or more auxiliary turbines include a first auxiliary turbine and a second auxiliary turbine that are connected in series,
wherein a discharge line is connected to an outlet of the second auxiliary turbine, and
wherein the discharge line joins the first distribution line.

12. The waste heat recovery system of claim 11, wherein a motor-generator is connected to the power turbine through a first shaft,
wherein a second shaft is connected to the one or more auxiliary turbines, and
wherein a clutch is located between the first and second shafts.

13. The waste heat recovery system of claim 12, further including:
an external shaft connected to at least one of the first and second shafts.

14. The waste heat recovery system of claim 13, wherein a power transmission mechanism is connected to the external shaft.

15. The waste heat recovery system of claim 11, wherein the one or more auxiliary turbines have a guide groove formed on an internal surface of an inlet chamber into which the working fluid is introduced.

* * * * *